(12) United States Patent
Ishihara et al.

(10) Patent No.: US 11,396,960 B2
(45) Date of Patent: Jul. 26, 2022

(54) WIRE HARNESS GROMMETS WITH PULL HANDLES AND METHODS OF USE

(71) Applicant: Toyota Motor Engineering & Manufacturing North America, Inc., Plano, TX (US)

(72) Inventors: Yoshiyuki Ishihara, Aichi (JP); Travis Thomas, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 211 days.

(21) Appl. No.: 16/817,024

(22) Filed: Mar. 12, 2020

(65) Prior Publication Data
US 2021/0285573 A1 Sep. 16, 2021

(51) Int. Cl.
*H02G 3/22* (2006.01)
*B60R 16/02* (2006.01)
*F16L 5/10* (2006.01)
*F16B 13/08* (2006.01)

(52) U.S. Cl.
CPC ............ *F16L 5/10* (2013.01); *F16B 13/0841* (2013.01)

(58) Field of Classification Search
CPC ............ B60R 16/0222; B60R 16/0207; H02G 3/0406; H02G 3/22; H02G 3/36; H02G 3/04; H02G 15/013; H02G 3/088; H01B 17/583; H01R 13/5219
USPC .... 174/152 G, 153 G, 152 R, 135, 650, 142; 16/2.1, 2.2; 248/56
See application file for complete search history.

(56) References Cited

U.S. PATENT DOCUMENTS

| | | | |
|---|---|---|---|
| 5,856,635 A * | 1/1999 | Fujisawa | B60R 16/0222 174/153 G |
| 5,973,271 A | 10/1999 | Fujita | |
| 5,977,486 A * | 11/1999 | Fujita | F16L 5/02 174/152 R |
| 6,240,597 B1 * | 6/2001 | Mochizuki | B60R 16/0222 16/2.1 |
| 6,350,091 B1 | 2/2002 | Mehta et al. | |
| 8,117,747 B2 * | 2/2012 | Fuller | F15B 21/085 29/868 |
| 8,475,098 B2 | 7/2013 | Marlow et al. | |

(Continued)

FOREIGN PATENT DOCUMENTS

| | | |
|---|---|---|
| JP | 2003164042 A | 6/2003 |
| JP | 5533368 B2 | 6/2014 |
| JP | 3251483 B2 | 5/2017 |

OTHER PUBLICATIONS

Running cables through firewall (https://www.tundras.com/threads/running-cables-through-firewall.12983/); accessed May 6, 2017.

(Continued)

*Primary Examiner* — Angel R Estrada
(74) *Attorney, Agent, or Firm* — Dinsmore & Shohl LLP

(57) ABSTRACT

A wire harness grommet includes a grommet body including a first flared portion, a second flared portion and a narrow portion between the first flared portion and the second flared portion. The first flared portion has a wire receiving opening extending therethrough for receiving one or more wires. A pull handle has a first end located at a first side of the first flared portion and a second end located at an opposite, second side of the first flared portion forming a closed loop.

18 Claims, 3 Drawing Sheets

(56) References Cited

U.S. PATENT DOCUMENTS

| | | | |
|---|---|---|---|
| 9,365,171 B2 * | 6/2016 | Shitamichi | B60R 16/0222 |
| 10,086,781 B2 * | 10/2018 | Miller | B60R 16/0222 |
| 10,272,855 B2 * | 4/2019 | Yabashi | F16L 5/10 |

OTHER PUBLICATIONS 1970-1972 Park brake handle rod, handle & grommet (https://www.classicmuscle.com/park-brake-handle-rod-handle-grommet); accessed Dec. 2, 2019.

* cited by examiner

WIRE HARNESS GROMMETS WITH PULL HANDLES AND METHODS OF USE

TECHNICAL FIELD

The present specification generally relates to grommets, and more specifically, wire harness grommets with pull handles and methods of use.

BACKGROUND

Grommets are frequently used to fill holes in walls, such as sheet metal walls. Some grommets have an opening through their centers through which wires may pass. The grommets can cover sharp edges of the walls and protect the wires from being cut while allowing the wires to pass through the holes in the walls. The grommets typically have a region of reduced outer diameter to facilitate engagement with perimeters of the holes. During installation, the grommets may be pushed into the holes in the walls until the region of reduced diameter engages the perimeter of the holes. What is needed is a grommet that has a wire receiving opening that allows one or more wires to pass therethrough that also has a pull handle that can be grasped and pulled through a hole in a wall for installation of the grommet.

SUMMARY

In one embodiment, a wire harness grommet includes a grommet body including a first flared portion, a second flared portion and a narrow portion between the first flared portion and the second flared portion. The first flared portion has a wire receiving opening extending therethrough for receiving one or more wires. A pull handle has a first end located at a first side of the first flared portion and a second end located at an opposite, second side of the first flared portion forming a closed loop.

In another embodiment, a method of forming a wire harness grommet is provided. The method includes pouring a liquid elastic forming material into a mold and allowing the elastic forming material to solidify. The mold comprises a cavity that is shaped to form a grommet body comprising a first flared portion, a second flared portion and a narrow portion between the first flared portion and the second flared portion. The first flared portion has a wire receiving opening extending therethrough for receiving one or more wires. A pull handle has a first end located at a first side of the first flared portion and a second end located at an opposite, second side of the first flared portion forming a closed loop.

In another embodiment, a method of running wire though a vehicle panel is provided. The method includes positioning a wire harness grommet behind the vehicle panel. The wire harness grommet includes a grommet body including a first flared portion, a second flared portion and a narrow portion between the first flared portion and the second flared portion. The first flared portion has a wire receiving opening extending therethrough for receiving one or more wires. A pull handle has a first end located at a first side of the first flared portion and a second end located at an opposite, second side of the first flared portion forming a closed loop. The pull handle is grasped and the first flared portion is pulled through a panel opening in the vehicle panel until the narrow portion is aligned with the vehicle panel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to wire harness grommets that include a grommet body and a wire receiving opening that can receive one or more wires therethrough. The one or more wires may be held within a wire harness that passes through the wire receiving opening such that the wires pass from an internal side of the grommet body to an opposite, external side of the grommet body. In some embodiments, a wire harness may not pass through the wire receiving opening, but the one or more wires may. A pull handle may be integrally formed with the grommet body such that the grommet body and the pull handle are a single, monolithic piece of material. The pull handle may form a closed loop with ends of the pull handle located on opposite sides of the grommet body for grasping the pull handle and pulling the grommet body through an opening in a vehicle panel.

Figure 1:
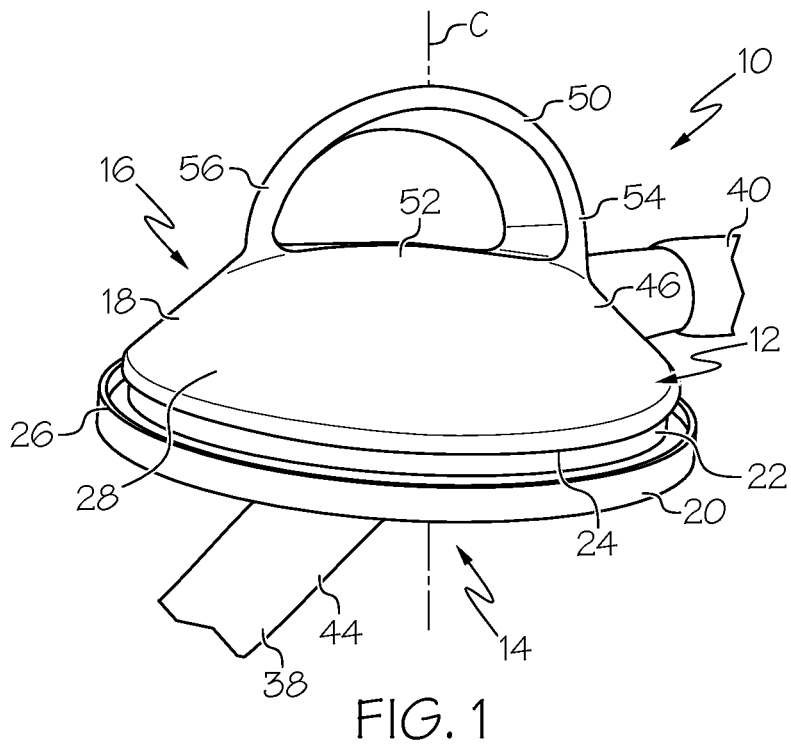
FIG. 1 is a top perspective view of a wire harness grommet, according to one or more embodiments shown and described herein.
Figure 2:
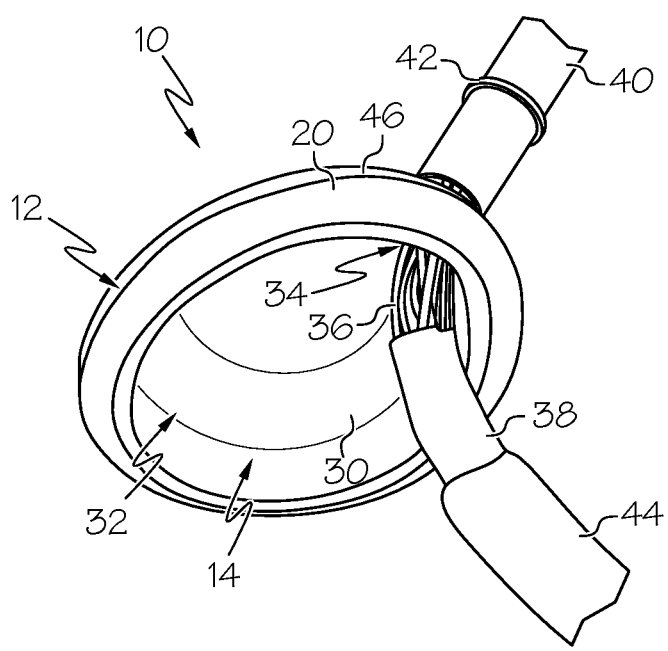
FIG. 2 is a bottom view of the wire harness grommet of FIG. 1, according to one or more embodiments shown and described herein.

Referring to FIG. 1, a wire harness grommet 10 includes a grommet body 12. Referring also to FIG. 2, the grommet body 12 has an internal side 14 and an external side 16 and includes a first flared portion 18 and a second flared portion 20 with a narrow portion 22 between the first flared portion 18 and the second flared portion 20. The narrow portion 22 has a width or outer diameter that is reduced compared to the first and second flared portions 18 and 20. The reduced width of the narrow portion 22 provides opposing mating surfaces 24 and 26 that face toward one another that can mate against a panel, such as a vehicle panel.

The first flared portion 18 is generally dome-shaped and includes an external surface 28 (FIG. 1) and an internal surface 30 (FIG. 2). Both the external surface 28 and the internal surface 30 extend away from the second flared portion 20 forming the dome shape and a hollow chamber 32 within the grommet body 12. A wire receiving opening 34 is provided that extends through the external surface 28 and the internal surface 30 providing access to the hollow chamber 32. One or more wires 36 may be passed through the wire receiving opening 34. The wires 36 may be at least partially encased within one or more wire harnesses 38 and 40. In the illustrated example, the wire harness 38 is located at the internal side 14 and the wire harness 40 is located at the external side 16. In some embodiments, one or both wire harnesses 38 and 40 may have a region 42, 44 or increased width or diameter that is larger than a width or diameter of the wire receiving opening 34 to inhibit movement of the wires 36 through the wire receiving opening 34.

As can be seen, the wire receiving opening 34 is located offset from a geometric centerline C of the grommet body 12. To this end, the wires 36 pass through a side 46 of the first flared portion 18. A pull handle 50 extends outward from the first flared portion 18 and is located at an apex 52 of the first flared portion 18. The pull handle 50 includes opposite ends 54 and 56 that are located at opposite sides 46 and 58 of the first flared portion 18 forming a closed loop. The pull handle 50 may be integrally formed with the grommet body 12 such that the grommet body 12 and the pull handle 50 are a single, monolithic piece of material.

Figure 3:
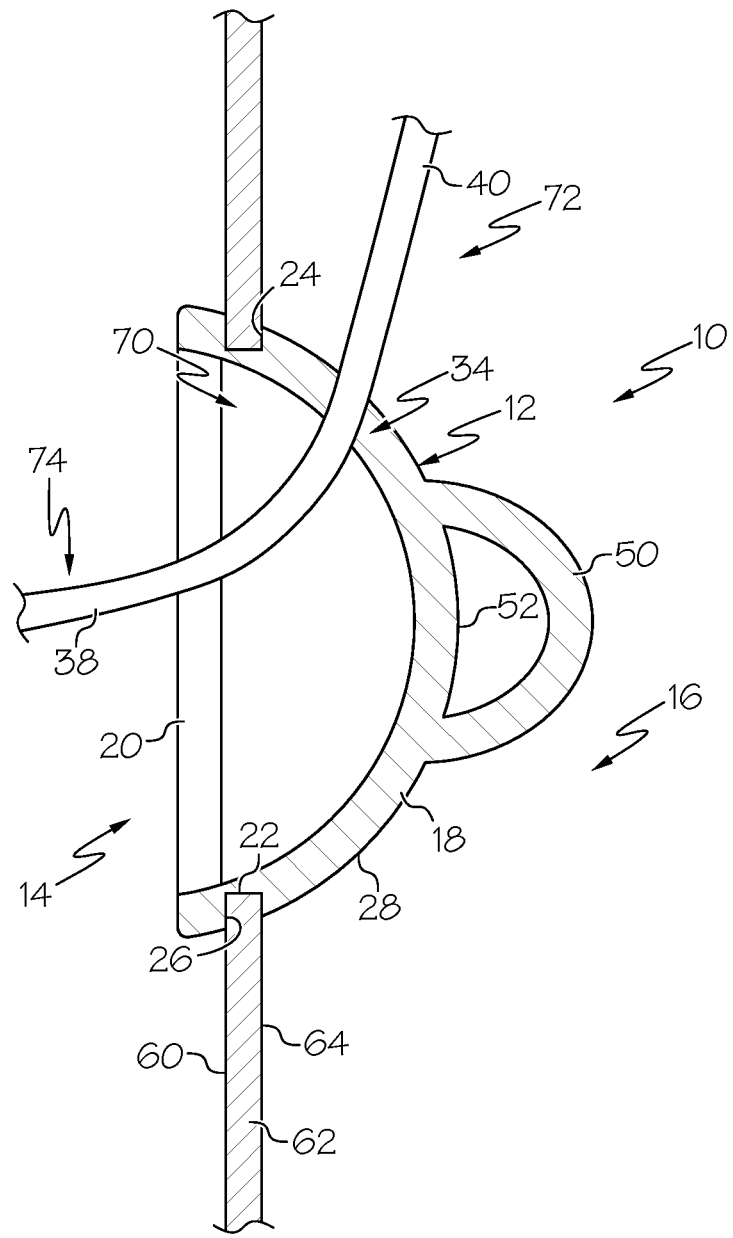
FIG. 3 is a diagrammatic side section view of the wire harness grommet of FIG. 1 in use inserted through a panel opening in a vehicle panel, according to one or more embodiments shown and described herein.

Referring to FIG. 3, the wire harness grommet 10 is illustrated in use and includes the mating surfaces 24 and 26 engaged with an external surface 60 of a vehicle panel 62 and an internal surface 64 of the vehicle panel 62. In particular, the mating surface 24 of the first flared portion 16 is mated with the internal surface 64 of the vehicle panel 62 and the mating surface 26 of the second flared portion 20 is mated with the external surface 60 of the vehicle panel 62. The mating surfaces 24 and 26 form seals on the opposite sides of the vehicle panel 62 that can inhibit passage of moisture and debris, such as dust, through the wire receiving opening 34 once installed.

The wire harness grommet 10 may be installed by placing the wire harness grommet 10 on the external side of the vehicle panel 62. The pull handle 50 may be aligned with a panel opening 70 of the vehicle panel 62 and the wire harness 38, 40 may be routed through the panel opening 70 with an internal portion 72 of the wire harness 38, 40 located at the internal side of the vehicle panel 62 and an exterior portion 74 of the wire harness 38, 40 located at the exterior side of the vehicle panel 62. The pull handle 50 may then be grasped by hand and the first flared portion 18 may be pulled through the panel opening 70. Because the first flared portion 18 is dome-shaped, the external surface 28 is tapered, decreasing in width or diameter from the mating surface 24 to the apex area 52. The dome shape of the first flared portion 18 facilitates passage of the first flared portion 18 through the panel opening 70. Grommet body 12 is widest at the second flared portion 20, which inhibits passage of the second flared portion 20 through the panel opening 70. The wire harness grommet 10 snaps into place once the vehicle panel 62 is aligned with the narrow portion 22.

Figure 4:
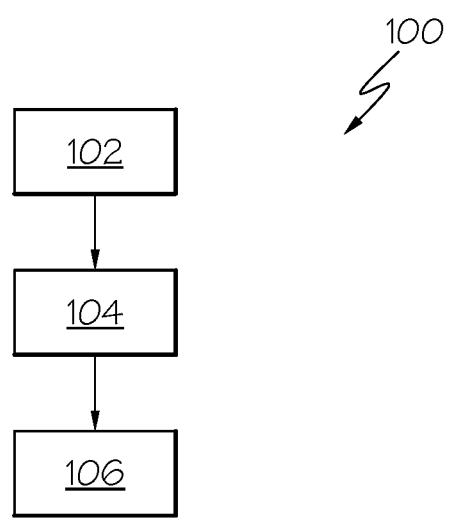
FIG. 4 illustrates a method of forming the wire harness grommet of FIG. 1, according to one or more embodiments shown and described herein.

Referring to FIG. 4, a method 100 of making the wire harness grommet includes pouring a liquid rubber or elastic plastic material into a mold at step 102 and allowing the elastic forming material to solidify at step 104. The term "elastic" refers to a material that, once solid, is able to resume its normal shape spontaneously after contraction. The mold shape may form the entire wire harness grommet including the grommet body and the pull handle that is monolithic with the grommet body at step 106. The wire harness grommet may then be removed from the mold and the wires inserted through the wire receiving opening for an installation procedure. While a circular wire harness grommet with a dome shape first flared portion are described above, the grommet body can be any suitable shape that corresponds to a shape of a panel opening. For example, the grommet body may be rectangular with a truncated pyramid shaped first flared portion.

The above-described wire harness grommets include an integral pull handle that allows an installer to grasp an pull the grommet body through a panel opening during an installation process. The pull handle is connected to the grommet body at both ends thereby forming a closed loop that allows for an even application of pull force at opposite sides of the grommet body.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wire harness grommet comprising:
   a grommet body comprising a first flared portion, a second flared portion and a narrow portion between the first flared portion and the second flared portion, the first flared portion having a wire receiving opening extending therethrough for receiving one or more wires; and
   a pull handle having a first end located at a first side of the first flared portion and a second end located at an opposite, second side of the first flared portion forming a closed loop;
   wherein the wire receiving opening is offset from a geometric centerline of the grommet body that passes through the pull handle.

2. The wire harness grommet of claim 1, wherein the grommet body and pull handle are a single, monolithic piece of material.

3. The wire harness grommet of claim 1, wherein the first flared portion is dome-shaped having a tapering profile to an apex area and defining a hollow chamber therein that is in communication with wire-receiving opening, the pull handle located on an opposite side of the first flared portion from the hollow chamber.

4. The wire harness grommet of claim 3, wherein the first and second ends of the pull handle are located at the apex area.

5. The wire harness grommet of claim 3, wherein the wire receiving opening is located offset from the apex area.

6. The wire harness grommet of claim 1, wherein the narrow portion has a reduced width compared to the first and second flared portions.

7. The wire harness grommet of claim 6, wherein a maximum width of the grommet body is at the second flared portion.

8. The wire harness grommet of claim 1, wherein the first and second ends of the pull handle intersect the first flared portion.

9. The wire harness grommet of claim 1, wherein the geometric centerline of the grommet body passes between the first and second ends of the pull handle.

10. A method of forming a wire harness grommet, comprising:
    pouring a liquid elastic forming material into a mold; and
    allowing the elastic forming material to solidify;
    wherein the mold comprises a cavity that is shaped to form a grommet body comprising a first flared portion, a second flared portion and a narrow portion between the first flared portion and the second flared portion, the first flared portion having a wire receiving opening extending therethrough for receiving one or more wires; and a pull handle having a first end located at a first side of the first flared portion and a second end located at an opposite, second side of the first flared portion forming a closed loop;

wherein the wire receiving opening is offset from a geometric centerline of the grommet body that passes through the pull handle.

11. The method of claim 10 further comprising removing the wire harness grommet from the mold.

12. The method of claim 11, wherein the grommet body is circular in cross-section.

13. The method of claim 11 further comprising inserting at least one wire through the wire receiving opening.

14. A method of running wire though a vehicle panel, the method comprising:

positioning a wire harness grommet behind the vehicle panel, the wire harness grommet comprising:

a grommet body comprising a first flared portion, a second flared portion and a narrow portion between the first flared portion and the second flared portion, the first flared portion having a wire receiving opening extending therethrough for receiving one or more wires; and a pull handle having a first end located at a first side of the first flared portion and a second end located at an opposite, second side of the first flared portion forming a closed loop;

wherein the wire receiving opening is offset from a geometric centerline of the grommet body that passes through the pull handle;

grasping the pull handle and pulling the first flared portion through a panel opening in the vehicle panel until the narrow portion is aligned with the vehicle panel.

15. The method of claim 14, wherein the grommet body and pull handle are a single, monolithic piece of material.

16. The method of claim 14, wherein the first flared portion is dome-shaped having a tapering profile to an apex area and defining a hollow chamber therein that is in communication with wire-receiving opening, the pull handle located on an opposite side of the first flared portion from the hollow chamber.

17. The method of claim 16, wherein the first and second ends of the pull handle are located at the apex area.

18. The method of claim 16, wherein the wire receiving opening is located offset from the apex area.

* * * * *